United States Patent
Yamashita (10) Patent No.: US 8,343,673 B2
(45) Date of Patent: Jan. 1, 2013

(54) FUEL CELL SYSTEM

(75) Inventor: Kiyomi Yamashita, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 308 days.

(21) Appl. No.: 11/861,864

(22) Filed: Sep. 26, 2007

(65) Prior Publication Data

US 2008/0096068 A1  Apr. 24, 2008

(30) Foreign Application Priority Data

Oct. 24, 2006 (JP) ................................. 2006-288284

(51) Int. Cl.
*H01M 8/10* (2006.01)

(52) U.S. Cl. ........ 429/428; 429/431; 429/432; 429/433; 429/442; 429/90

(58) Field of Classification Search .................... 429/13, 429/428, 431, 432, 433, 442, 90
See application file for complete search history.

(56) References Cited

U.S. PATENT DOCUMENTS

| | | | |
|---|---|---|---|
| 6,011,324 A | 1/2000 | Kohlstruck et al. | |
| 7,560,179 B2 * | 7/2009 | Tahara | 429/431 |
| 2003/0124400 A1 | 7/2003 | Hara et al. | |
| 2008/0026271 A1 * | 1/2008 | Ueda et al. | 429/23 |

FOREIGN PATENT DOCUMENTS

| | | | |
|---|---|---|---|
| DE | 195 38 381 A1 | | 4/1997 |
| JP | 57212776 | * | 12/1982 |
| JP | 4-87157 | | 3/1992 |
| JP | 4-304126 | | 10/1992 |
| JP | 6-223854 | | 8/1994 |
| JP | 8-21408 | | 3/1996 |
| JP | 2001-23663 | | 1/2001 |
| JP | 2003-197231 | | 7/2003 |
| JP | 2004-15035 | | 1/2004 |
| JP | 2004-213985 | | 7/2004 |
| JP | 2005-26010 | | 1/2005 |
| JP | 2006-275479 | | 10/2006 |
| JP | 2007-135364 | | 5/2007 |
| WO | WO2006006672 | * | 1/2006 |
| WO | WO 2006/095555 A1 | | 9/2006 |

OTHER PUBLICATIONS

U.S. Appl. No. 11/995,203, filed Jan. 10, 2008, Takada.
U.S. Appl. No. 12/104,055, filed Apr. 16, 2008, Takada, et al.
U.S. Appl. No. 12/375,142, filed Jan. 26, 2009, Ohkawara, et al.
U.S. Appl. No. 12/279,154, filed Aug. 12, 2008, Ohkawara.
U.S. Appl. No. 12/293,158, filed Sep. 16, 2008, Kuwaba.
Office Action issued Apr. 17, 2012 in Japanese Application No. 2006-288284.

* cited by examiner

*Primary Examiner* — Patrick Ryan
*Assistant Examiner* — Ladan Mohaddes
(74) *Attorney, Agent, or Firm* — Oblon, Spivak, McClelland, Maier & Neustadt, L.L.P.

(57) ABSTRACT

A fuel cell system is provided with a fuel cell, a system power source, an inverter system and a fuel gas supply device for supplying the fuel cell with fuel gas of a regulated quantity, wherein when the system power source falls in a power failure during the power use by the external loads, at least one of the power use by the internal loads (resistances) and the supply quantity of the fuel gas supply device is altered in dependence on the output power from the fuel cell or the power use by the external loads.

11 Claims, 4 Drawing Sheets

FUEL CELL SYSTEM

INCORPORATION BY REFERENCE

This application is based on and claims priority under 35 U.S.C. 119 with respect to Japanese Application No. 2006-288284 filed on Oct. 24, 2006, the entire content of which is incorporated herein by reference.

BACKGROUND OF THE INVENTION

1. Field of the Invention

The present invention relates to a fuel cell system and in particular, to the control of a fuel cell system in the event of a power failure.

2. Discussion of the Related Art

As one form of fuel cell systems, there has been known one which is described in Japanese examined patent No. 08-21408. As shown in FIG. 1 of the Japanese patent, the fuel cell system is provided with two resistances 10, 15 having low and high resistance values which are connected to direct current output terminals of a fuel cell 1 in parallel relation for discharging residual voltage at the time of the operation stop of the fuel cell, a normal closed switch 14 connected to the resistance 15 with the high resistance value for making the resistance 15 active or passive, and a normal open switch 9 connected to the resistance 10 with the low resistance valve for making the resistance 10 active or passive.

With the system, in the event of a power failure of the control power supply, both of the high resistance 15 and the low resistance 10 are made to be active by the manipulations of the switches 14, 9 immediately after the power failure to lower the residual voltage quickly to an electric potential for the protection of the power supply. Then, the low resistance 10 is made to be passive to lower the residual voltage slowly.

In the fuel cell system described in the aforementioned Japanese patent, since the residual voltage is lowered (i.e., electric power is used) regardless of the output voltage of the fuel cell 1 (or the service voltage for loads in the power system) in the event of a power failure, there is a risk that the residual voltage cannot be lowered appropriately. Further, there arises a problem that the use of electric power by the resistances 10, 15 for a long time causes the resistances 10, 15 to become high temperatures.

SUMMARY OF THE INVENTION

Accordingly, it is a primary object of the present invention to provide a fuel cell system capable of using the output electric power of a fuel cell without making internal loads high temperatures in the event of a power failure of a system power source.

Briefly, according to the present invention, there is provided a fuel cell system, which comprises a fuel cell for generating electric power through the reaction of fuel gas with oxidizing gas to supply the generated electric power to internal loads and external loads which are arranged respectively inside and outside the fuel cell system; a system power source for supplying electric power to the internal loads and the external loads; and an inverter system. The inverter system has a first function of converting direct current voltage outputted from the fuel cell into predetermined alternating current voltage to output the alternating current voltage to power lines connected to the system power source, a second function of converting alternating current voltage from the power lines into predetermined direct current voltage to output the direct current voltage to the internal loads, and a third function of converting the direct current voltage from the fuel cell into predetermined direct current voltage to output the direct current voltage to the internal loads. The fuel cell system further comprises a fuel gas supply device for supplying the fuel cell with fuel gas of a regulated quantity; and a controller for performing a control operation so that when the system power source falls in a power failure during the power use by the external loads, at least one of the power use by the internal loads and the supply quantity of the fuel gas supply device is altered in dependence on the output power from the fuel cell or the power use by the external loads.

With this configuration, when the system power source falls in a power failure during the power use by the external loads, at least one of the power use by the internal loads and the supply quantity of the fuel gas supply device is controlled to be altered in dependence on the output power of the fuel cell or the power use by the external loads. Thus, it can be realized to use the output power of the fuel cell appropriately in dependence on the output power of the fuel cell or on the power use by the external devices. Further, since the output power of the fuel cell is used by altering at least either one of the electric power used by the external loads and the supply quantity from the fuel gas supply device, it becomes possible to suppress the temperature increases of the internal loads and hence, to suppress the deterioration of peripheral devices.

BRIEF DESCRIPTION OF THE ACCOMPANYING DRAWINGS

The foregoing and other objects and many of the attendant advantages of the present invention may readily be appreciated as the same becomes better understood by reference to the preferred embodiment of the present invention when considered in connection with the accompanying drawings, wherein like reference numerals designate the same or corresponding parts throughout several views, and in which.

DETAILED DESCRIPTION OF THE PREFERRED EMBODIMENT

Figure 1:
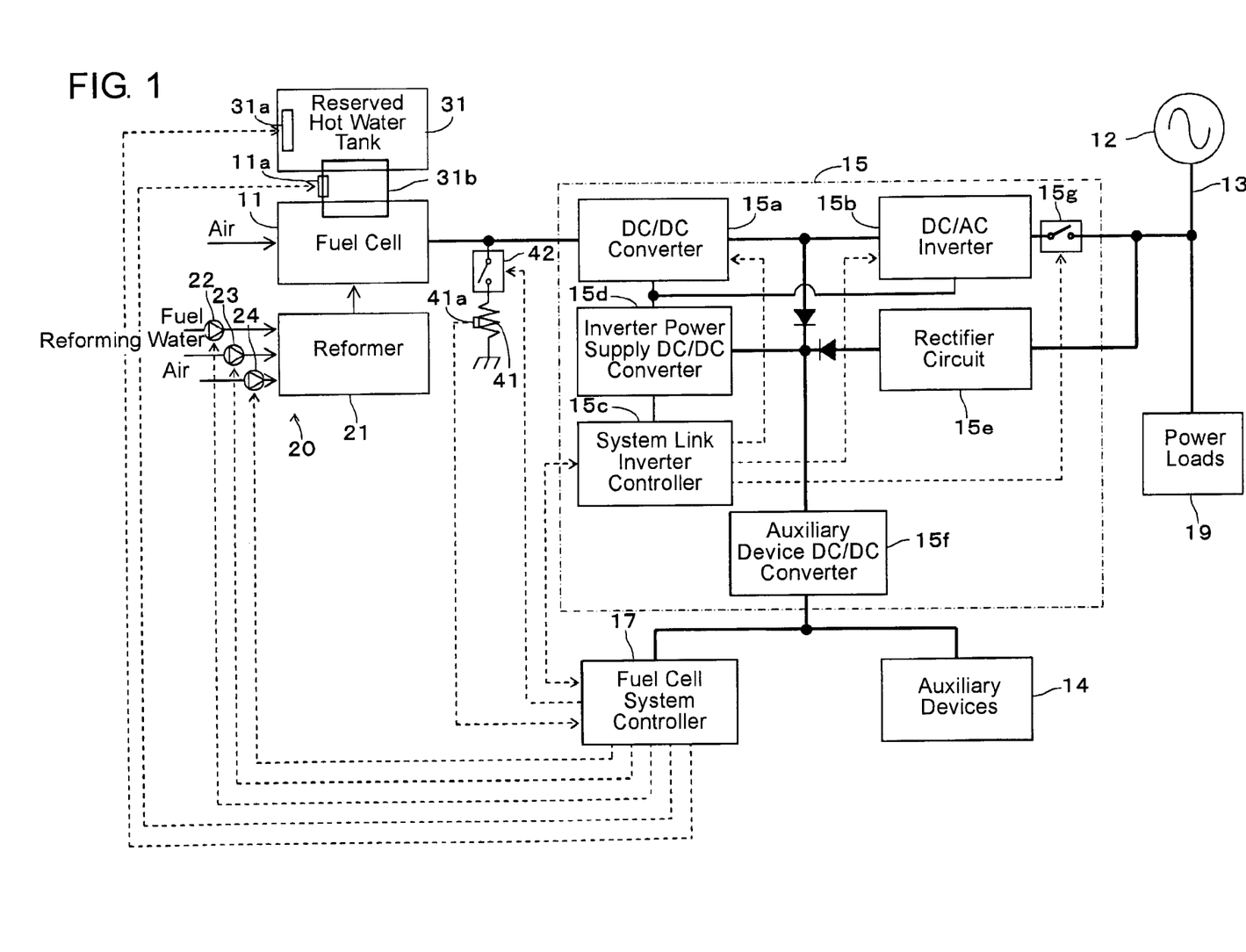
FIG. 1 is a block diagram showing the construction of a fuel cell system in one embodiment according to the present invention.

Hereafter, a fuel cell system in one embodiment according to the present invention will be described with reference to the drawings. The fuel cell system is composed of a fuel cell 11, a system power source 12, power lines 13, an auxiliary device 14, an inverter system 15, a fuel cell system controller 17, a reformer 21, a reserved hot water tank 31 and a resistance 41.

The fuel cell 11 is supplied with fuel gas (hydrogen gas) and an oxidizing agent (oxygen-containing air) and generates electric power through the reaction of the hydrogen and oxygen to output direct current voltage (e.g., 40 volts). The fuel cell 11 has the maximum output power of 1000 watts and the minimum output power of 300 watts.

The reformer 21 steaming-reforms the fuel (reforming fuel) to supply the fuel cell 11 with hydrogen-rich reforming gas and is composed of a burner (burning section), a reforming section, a carbon monoxide shift reaction section (hereafter referred to as "CO shift section") and a carbon monoxide selective oxidization section (hereafter referred to as "CO selective oxidization section"), which are all omitted from illustration as being well-known in the art. As the fuel, there may be employed natural gas, LPG, kerosene, gasoline, methanol or the like.

The burner is supplied with combustion fuel and combustion air from outside at the time of operation start, and is supplied with anode offgas (i.e., reforming gas supplied to the fuel cell 11 but exhausted without being consumed) from a fuel pole of the fuel cell 11 at the time of ordinary operation, wherein the burner combusts each supplied combustible gas and leads the combusted gas to the reforming section.

The reforming section reforms a mixture gas, made by mixing the steam (reforming water) from an evaporator with the fuel supplied from the outside, through catalyzer filled in the reforming section and generates hydrogen gas and carbon monoxide gas (a so-called steam reforming reaction). At the same time, it regenerates hydrogen gas and carbon dioxide from the carbon monoxide and steam which are generated in the steam reforming reaction (a so-called carbon monoxide shift reaction). The generated gas (i.e., reforming gas) is led to the CO shift section.

The CO shift section reacts the carbon monoxide and steam, included in the reforming gas, through the catalyzer filled therein to regenerate hydrogen gas and carbon dioxide gas. Thus, the reforming gas is reduced in the density of carbon monoxide and is led to the CO selective oxidization section.

The CO selective oxidization section regenerates carbon dioxide by reacting the residual carbon oxide in the reforming gas with air for CO purification which air is further supplied from outside, through the catalyzer filled therein. Thus, the reforming gas is further reduced (less than 10 ppm) in the density of carbon monoxide and is led to the fuel pole of the fuel cell 11.

Fuel (reforming fuel), reforming water (water) and air (for CO purification) are supplied to the reformer 21 respectively by a fuel pump 22, a reforming water pump 23 and an air pump 24, and the supply quantities are controlled in accordance with commands from the fuel cell system controller 17. It can be realized to regulate the supply quantity of the reforming gas (fuel gas) supplied from the reformer 21 by controlling the supply quantities from the fuel pump 22, the reforming water pump 23 and the air pump 24.

A fuel gas supply device 20 is constituted by the aforementioned reformer 21, fuel pump 22, reforming water pump 23 and air pump 24. The fuel gas supply device 20 may be constituted by a hydrogen gas canister (hydrogen gas tank or hydrogen gas cylinder) and a regulator valve for regulating the supply quantity from the hydrogen gas canister.

The system power source (or commercial power supply) 12 supplies electric power to external loads 19 through the power lines 13 connected to the system power source 12. The fuel cell 11 is connected to the power lines 13 through the inverter system 15. The external loads 19 are power loads connected outside the fuel cell system and comprise household electric appliances such as, for example, TV, air conditioner, washer or the like.

The auxiliary devices 14 as one kind of internal loads are composed of motors (not shown) for driving the aforementioned respective pumps 22-24, electromagnetic valves for supplying the reformer 21 with fuel, water and air, and electromagnetic valves for supplying the fuel cell 11 with reforming gas and air (oxygen). The auxiliary devices 14 are driven with the supply of the direct current voltage, and the driving voltage is supplied from an auxiliary device DC/DC converter 15f. The electric power used by the auxiliary devices 14 and the fuel cell system controller 17 is about 100 watts in total. The internal loads are power loads arranged inside the fuel cell system and include the auxiliary devices 14, the fuel cell system controller 17, heater devices 11a, 31a and the resistance 41.

The inverter system 15 has a function of converting the direct current voltage outputted from the fuel cell 11 into predetermined alternating current voltage to output the same to the power lines 13 connected to the system power source 12, another function of converting the alternating current voltage from the power lines 13 into predetermined direct current voltage to output the same to the internal loads such as the auxiliary devices 14, the fuel cell system controller 17 and the heater devices 11a, 31a except for the resistance 41, and another function of converting the direct current voltage from the fuel cell 11 into predetermined direct current voltage to output the same into the internal loads except for the aforementioned resistance 41.

Specifically, the inverter system 15 is composed of a DC/DC converter 15a, a DC/AC inverter 15b, a system link inverter controller 15c, an inverter power supply DC/DC converter 15d, and the auxiliary device DC/DC converter 15f.

The DC/DC converter 15a converts the direct current voltage (e.g., 40 volts) outputted from the fuel cell 11 into predetermined direct current voltage (e.g., 350 volts). The DC/AC inverter 15b converts the direct current voltage outputted from the DC/DC converter 15a into alternating current voltage (e.g., 200 volts) to output the same to the power lines 13 or converts the alternating current voltage (e.g., 200 volts) from the power lines 13 into predetermined direct current voltage (e.g., 350 volts). The DC/AC inverter 15b has a function of measuring the alternating current voltage from the system power source 12 and transmits the measuring result to the system link inverter controller 15c.

The system link inverter controller 15c controls the driving of the DC/DC converter 15a and the DC/AC inverter 15b. The system link inverter controller 15c is connected to the fuel cell system controller 17 to be able to communicate with each other and controls the driving of the DC/DC converter 15a and the DC/AC inverter 15b in response to a command from the fuel cell system controller 17.

Further, the system link inverter controller 15c is able to judge whether or not the system power source 12 is in the state of a power failure, based on the measured voltage of the system power source 12 from the DC/AC inverter 15b. The system link inverter controller 15c switches a power failure time breaker relay 15g to an open state when judging the system power source 12 to be in the power failure state. The system link inverter controller 15c switches the power failure time breaker relay 15g to a closed state when judging the system power source 12 not to be in the power failure state.

The inverter power supply DC/DC converter 15d has the direct current voltage inputted from the DC/DC converter 15a or the DC/AC inverter 15b and converts the direct current voltage into predetermined direct current voltage to output the same as power supply voltage (driving voltage) to the DC/DC converter 15a, the DC/AC inverter 15b and the system link inverter controller 15c.

A rectifier circuit 15e is provided between the power lines 13 and the auxiliary devices 14 in juxtaposition with the inverter system 15 and is composed of rectifier elements. Prior to the power generation by the fuel cell system, the rectifier circuit 15e is able to rectify the alternating current voltage from the power lines 13 and is able to convert the rectified alternating current voltage into direct current voltage to apply the same to the auxiliary devices 14. For example, the rectifier circuit 15e is configured by four diodes as rectifier elements, which are arranged to constitute a diode bridge circuit. The rectifier circuit 15e may be combined with a transformer or may be combined with resistances, condensers, coils or the like for smoothing.

The auxiliary device DC/DC converter 15f has the direct current voltage inputted from the DC/DC converter 15a, the DC/AC inverter 15b or the rectifier circuit 15e and converts the direct current voltage into predetermined direct current voltage (e.g., 24 volts) to supply the same as power voltage to the auxiliary devices 14.

The power failure time breaker relay 15g is connected between the DC/AC inverter 15b and the system power source 12 (or the power lines 13) and brings the DC/AC inverter 15b into connection to or interruption from the system power source 12 in response to a command from the system link inverter controller 15c.

The fuel cell system controller 17 concentrically performs the overall control of the fuel cell system and controls the driving of the auxiliary devices 14 and the driving of the inverter system 15. The fuel cell system controller 17 is usually supplied with the voltage regardless of being at the stand-by time or the operation time (including the start operation and the power generation operation).

The resistance 41 is one of the internal loads and is connected as one only between the fuel cell 11 and the inverter system 15 in parallel to the inverter system 15 for consuming or using the electric power outputted from the fuel cell 11 after the occurrence of a power failure of the system power source 12. That is, the resistance 41 is provided between the fuel cell 11 and the DC/DC converter 15a in parallel to the DC/DC converter 15a. The capacity (power use) of the resistance 41 is set to 300 watts. The resistance 41 is connected in series to a resistance relay 42. The resistance relay 42 is controlled to be closed or opened in response to a command from the fuel cell system controller 17. When it is judged by the system link inverter controller 15c that the system power source 12 is in the state of a power failure, the resistance relay 42 is switched to the closed state, whereby the output electric power from the fuel cell 11 is used by the resistance 41. When it is judged by the system link inverter controller 15c that the system power source 12 is not in the state of a power failure, the resistance relay 42 is switched to the open state, whereby the output electric power from the fuel cell 11 is not used by the resistance 41.

Further, the resistance 41 is provided with a temperature sensor 41a for detecting the temperature of the resistance 41. The detection result from the temperature sensor 41a is transmitted to the fuel cell system controller 17.

The reserved hot water tank 31 is for reserving hot water heated by the waste heat from the fuel cell 11. The reserved hot water tank 31 is provided with a heater device (e.g., electric heater) 31a for heating the reserved hot water or the reserved hot water tank 31. The heater device 31a is controlled to be driven in response to a command from the fuel cell system controller 17. The heating capacity of the heater device 31a is desirable to be several hundred watts. The heater device 31a is also one of the internal loads.

A heating medium circulation circuit 31b is provided between the reserved hot water tank 31 and the fuel cell 11, and the heating medium circulation circuit 31b enables a pump (not shown) to circulate the heating medium which has collected the waste heat from the fuel cell 11. The reserved hot water in the reserved hot water tank 31 is heated through heat exchange with the heating medium. The heating medium circulation circuit 31b is provided thereon with a heater device 11a for heating the fuel cell 11 through the heating medium. The heater device 11a is controlled to be driven in response to a command from the fuel cell system controller 17. The heating capacity of the heater device 11a is desirable to be several hundred watts. The heater device 11a is also one of the internal loads. The heater device 11a may be provided in the fuel cell 11.

The heater devices 11a, 31a are connected to be supplied with the electric power derived from the auxiliary device DC/DC converter 15f. Further, the heater devices 11a, 31a may be provided between the fuel cell 11 and the inverter system 15 (to be exact, DC/DC converter 15a) in juxtaposition with the inverter system 15. Where so modified, it becomes possible to use a low-voltage resistance relay 42, resulting in a low cost. The reason for this is that the stage behind the DC/DC converter 15a is made to be at a high voltage and hence, that an expensive relay should be unavoidable for use at that stage.

(Operation)

The operation of the fuel cell system as constructed above will be described hereafter. When the fuel cell system is in the state of preparation for power generation, the fuel cell 11 is in warming up and is not generating electric power, and the fuel system is supplied with electric power from the system power source 12. That is, the driving of the DC/AC inverter 15b and the DC/DC converter 15a is stopped in response to a command from the system link inverter controller 15c (in response to a command from the fuel cell system controller 17). Further, the power failure time breaker relay 15g is brought by a command from the system link inverter controller 15c (by a command from the fuel cell system controller 17) into the closed state. Thus, the alternating current voltage from the system power source 12 is rectified and converted by the rectifier circuit 15e into direct current voltage, which is then step down at the auxiliary device DC/DC converter 15f to be supplied to the fuel cell system controller 17 and the auxiliary devices 14.

When the fuel cell system operates to generate electric power, the DC/DC converter 15a and the DC/AC inverter 15b are brought into operation based on a command from the system link inverter controller 15c (based on a command from the fuel cell system controller 17). Further, the power failure time breaker relay 15g remains in the closed state. Thus, the electric power from the fuel cell 11 is boosted by the DC/DC converter 15a, and the boosted electric power is supplied to the auxiliary device DC/DC converter 15f and hence, to the fuel cell system controller 17 and the auxiliary devices 14. Further, the electric power from the fuel cell 11 is supplied to the external loads 19 through the DC/DC converter 15a and the DC/AC inverter 15b.

The operation of the fuel cell system in the event of a power failure of the system power source 12 will be described in accordance with a flow chart shown in FIG. 2. When a power failure of the system power source 12 occurs in the state that the fuel cell system is operating to generate electric power with the same being used at the external loads 19, the fuel cell system controller 17 (the system link inverter controller 15c) detects the occurrence of the power failure by utilizing the voltage measuring function of the DC/AC converter 15b (step 102). Then, the fuel cell system controller 17 executes processing for a first power failure mode (step 104).

Specifically, the fuel cell system controller 17 first controls the power failure time breaker relay 15g to bring the same into the open state. At the same time or after a predetermined short time t0 (e.g., one second later), the fuel cell system controller 17 controls the resistance relay 42 to be switched from the open state to the closed state. As a consequence, the output electric power from the fuel cell 11 which has been generating electric power to follow the electric power (e.g., 1000 watts) used at the external loads 19 is not supplied to the external loads 19, but supplied to the resistance 41 to be used thereby. The output electric power from the fuel cell 11 is also used by being supplied not only to the resistance 41 but also to the auxiliary devices 14 which have been operated for power generation.

On the other hand, the fuel cell system controller 17 controls the fuel gas supply device 20 to decrease the supply quantity of fuel gas to the fuel cell 11. This control can be done by controlling the fuel pump 22, the reforming water pump 23 and the air pump 24 to regulate the supply quantities of fuel, reforming water and air to the reformer 21. With the decrease in the supply quantity of the fuel gas to the fuel cell 11, the generated power quantity of the fuel cell 11 is decreased to the lowest or minimum output power (e.g., 300 watts). The speed for the decrease at this time is set desirably not to provide any damage to the fuel cell 11.

The temperature of the resistance 41 rises when the electric power from the fuel cell 11 is used by the resistance 41. With this into account, the fuel cell system controller 17 detects the temperature of the resistance 41 with the temperature sensor 41a. Where the recovery from the power failure is made until a first predetermined time t1 (e.g., five minutes) elapses from the occurrence of the power failure with the temperature of the resistance 41 not reaching a first predetermined temperature TH1 (e.g. 96° C.), the fuel cell system controller 17 makes judgments of "NO" and "YES" respectively at steps 106 and 108 and executes a processing for a recovery standby mode. The same processing as that in the aforementioned first power failure mode is executed in this recovery standby mode.

Unless the temperature of the resistance 41 reaches a second predetermined temperature TH2 (e.g., 150° C.) higher than the first predetermined temperature TH1 ("NO" at step 112) during the recovery standby mode, the fuel cell system controller 17 executes the processing for recovery, that is, makes a system link by connecting the fuel cell 11 with the power lines 13 and initiates an ordinary power generation (step 114). On the other hand, when the temperature of the resistance 41 reaches the second predetermined temperature TH2 (e.g., 150° C.) higher than the first predetermined temperature TH1 ("YES" at step 112), the fuel cell system controller 17 executes processing for a whole stop mode (step 120). In the whole stop mode, the fuel cell system controller 17 stops the driving of all the pumps and brings all the valves into the closed state.

Further, by the execution of the processing for the aforementioned first power failure mode, there arises a situation that the temperature of the resistance 41 reaches the first predetermined temperature TH1 (e.g. 96° C.) or another situation that the recovery from the power failure is not made until the lapse of the first predetermined time t1 from the occurrence of the power failure with the temperature of the resistance 41 remaining not to reach the first predetermined temperature TH1 (e.g. 96° C.). When either of these situations arises, the fuel cell system controller 17 executes a processing for a second power failure mode (step 116). The same processing as that in the aforementioned first power failure mode is executed in this second power failure mode.

By the execution of the second power failure mode, there arises a situation that the temperature of the resistance 41 reaches the second predetermined temperature TH2 (e.g., 150° C.) higher than the first predetermined temperature TH1 (e.g. 96° C.) ("YES" at step 118) or another situation that the recovery from the power failure is not made until the lapse of a second predetermined time t2 (e.g., ten minutes) longer than the first predetermined time t1 (e.g., five minutes) from the occurrence of the power failure with the temperature of the resistance 41 remaining not to reach the second predetermined temperature TH2 ("NO" at steps 118 and 122). When either of these situations arises, the fuel cell system controller 17 executes the processing for the whole stop mode (step 120).

On the other hand, where during the execution of the second power failure mode, the recovery from the power failure is made until the second predetermined time t2 elapses from the occurrence of the power failure with the temperature of the resistance 41 remaining not to reach the second predetermined temperature TH2 ("NO" at step 118 and "YES" at step 122), the fuel cell system controller 17 executes processing for an ordinary stop mode (step 124). The ordinary stop mode is processing for stopping the fuel cell system in accordance with a predetermined sequence.

Figure 2:
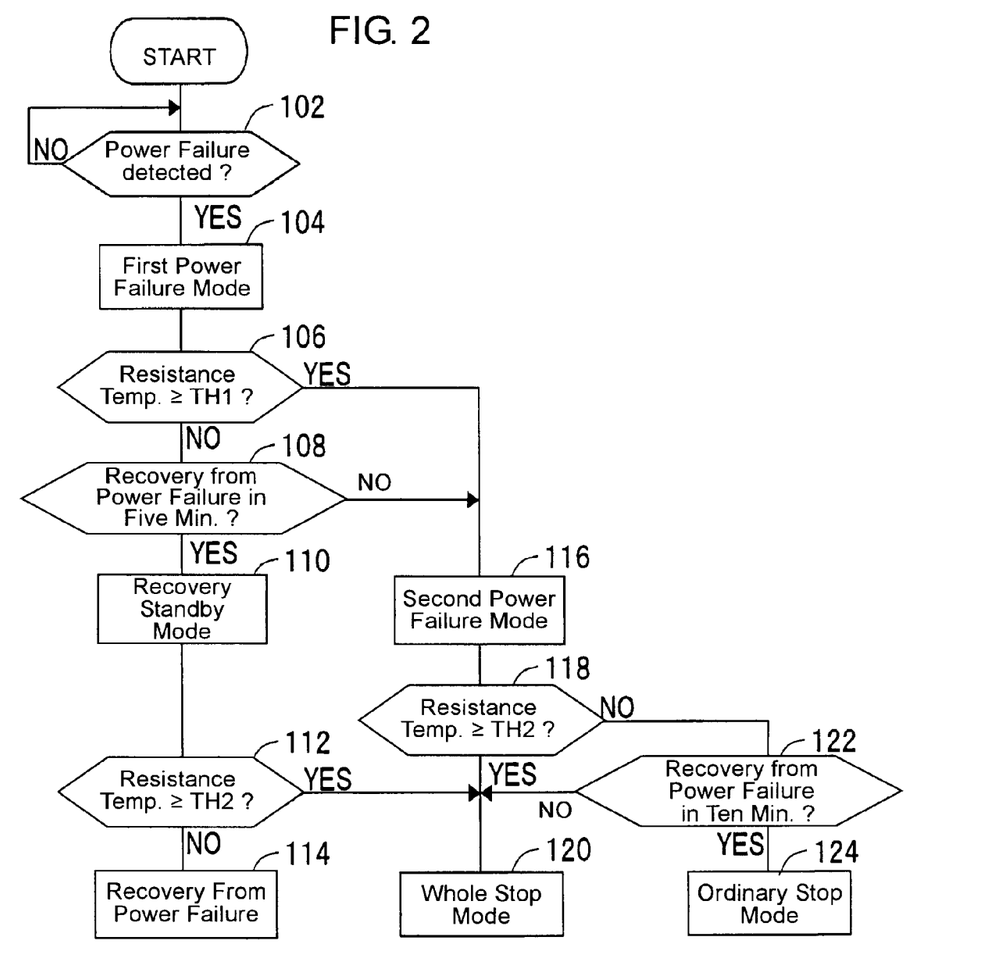
FIG. 2 is a flow chart of a control program executed by a fuel cell system controller shown in FIG. 1.
Figure 2A:
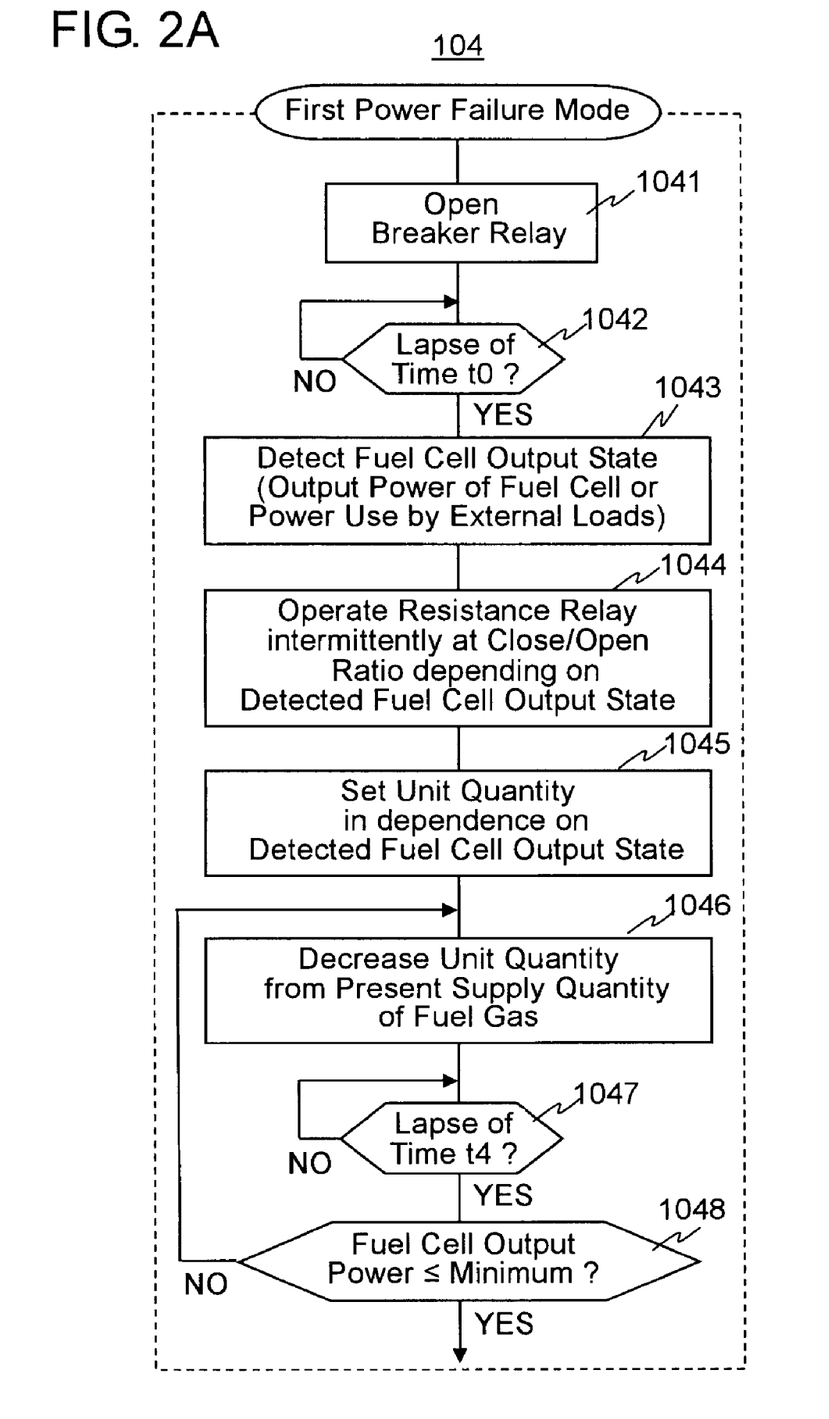
FIG. 2A is a partial flow chart showing the details of a step in FIG. 2 in the embodiment.

FIG. 2A shows detailed processing for the first power failure mode executed at step 104 in FIG. 2. Upon detection of a power failure, the power failure time breaker relay 15g is opened (step 1041), and after the lapse (step 1042) of the predetermined time t0 which is set to zero or one second in advance, the power output state of the fuel cell 11 is detected from the output power of the fuel cell 11 or from the power use by the external loads 19. The resistance relay 42 is then operated intermittently at step 1044. That is, the close and open operations of the resistance relay 42 are repetitively performed for a predetermined time t3 (e.g., several minutes or so) or through a predetermined number of times. The ratio of the closed time to the open time of the resistance relay 42 is determined in dependence on the output state of the fuel cell 11 detected at step 1043. As a consequence, the power use by the internal loads (i.e., resistance 41, heater devices 11a, 31a, auxiliary devices 14 and the like) can be altered appropriately in dependence on the power output state of the fuel cell 11 (i.e., the output power of the fuel cell 11 or the power use by the external loads 19).

Upon completion of controlling the alteration of the power use by the internal loads, a unit quantity is set in dependence on the detected fuel cell output state (step 1045). The unit quantity is set to be large or small in dependence on the detected fuel cell output state at the time of the occurrence of the power failure. The set unit quantity is then used to decrease the same from the present supply quantity of fuel gas to the fuel cell 11. That is, the fuel cell system controller 17 controls the fuel pump 22, the reforming water pump 23 and air pump 24 so that the fuel gas supply to the fuel cell 11 is decreased by the unit quantity (step 1046). After the lapse of a predetermined time t4 (step 1047) which is set to be long enough for the fuel cell output power to react to the decrease of the fuel gas supply quantity, a judgment is made at step 1048 of whether or not, the fuel cell output power has been lowered to the lowest or minimum output power (e.g., 300 watts). The aforementioned processing at steps 1046 to 1048 are repeated until the fuel cell output power is lowered to the minimum output power. As a consequence, the fuel gas supply quantity by the fuel gas supply device 20 can also be altered in dependence on the power output state of the fuel cell 11 (i.e., the output power of the fuel cell 11 or the power use by the external loads 19). It is to be noted that the embodiment describes the alteration in both of the power use by the internal loads and the fuel gas supply quantity by the fuel gas supply device 20, the present invention may be implemented in the form of altering either one of the power use by the internal loads and the fuel gas supply quantity by the fuel gas supply device 20.

As is clear from the foregoing description, in the present embodiment, when the system power source 12 falls in a power failure while the external devices 19 are using the electric power from the fuel cell system, the fuel cell system controller 17 alters at least either one of the use by the internal loads (resistance 41, heater devices 11*a*, 31, auxiliary devices 14 and controllers 17, 15*c*) of the output power and the supply quantity from the fuel gas supply device 20 in dependence on the output power from the fuel cell 11 or the use of the electric power at the external devices 19. As a consequence, it can be realized to use the output power from the fuel cell 11 appropriately in dependence on the output power of the fuel cell 11 or the electric power used by the external loads 19. Further, since the output power of the fuel cell 11 is controllably used by altering at least either one of the electric power used by the internal loads and the supply quantity from the fuel gas supply device 20, it becomes possible to suppress the temperature increases of the internal loads and hence, to suppress the deterioration of peripheral devices.

Further, since a main component of the internal loads can be constituted by the resistance 41, it can be realized to use the output power of the fuel cell 11 appropriately in a simplified construction while suppressing the number of components for the fuel cell system and hence, an increase in cost.

Further, the resistance 41 is arranged between the fuel cell 11 and the inverter system 15 in juxtaposition with the inverter system 15. Thus, since the output power of the fuel cell 11 can be directly used by the resistance 41 without passing through the inverter system 15, it becomes possible to use the output power of the fuel cell 11 surely regardless of the inverter system 15.

Additionally, since the internal loads include the existing heater devices 11*a*, 31*a* which are provided for heating the fuel cell system, it becomes possible to use the output power of the fuel cell 11 surely without involving an increase in the number of components for the fuel cell system and an increase in cost.

(Modifications)

Figure 3:
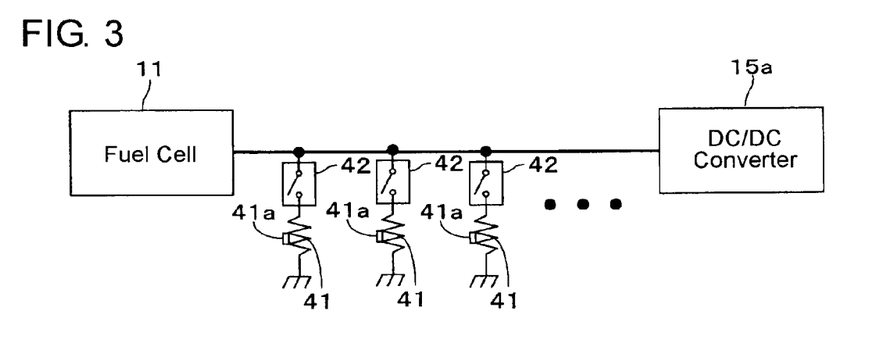
FIG. 3 is a block diagram showing in an enlarged scale the construction of a part of a fuel cell system in the modified form of the embodiment.

Although in the foregoing embodiment, only one resistance 41 is provided between the fuel cell 11 and the inverter system 15 in juxtaposition with the inverter system 15, there may be provided a plurality of resistances 41 in parallel relation with one another, as shown in FIG. 3. In this modified form each resistance 41 has a resistance relay 42 connected thereto in series and is also provided with a temperature sensor 41*a* attached thereto. Thus, it becomes possible to alter the power use by the internal loads stepwise. The alteration in the electric power used by the internal loads may be made based on the temperature (the directly measured temperature of each resistance 41 or the peripheral temperature thereof) which correlates with the inner loads (resistances 41) or based on the duration of the power use by the inner loads.

For example, the number of the resistances 41 which are to be active is set in dependence on the output power of the fuel cell 11 or on the electric power used by the external devices 19. That is, the number of the resistances 41 being held in the active state may be decreased as the output power of the fuel cell 11 is decreased after the occurrence of the power failure. Further, the number of the resistances 41 being held active may be decreased as the temperature of the resistances 41 lowers. Alternatively, where the temperature of the resistances 41 rises as the time goes, the number of the resistances 41 being held passive may be increased. Further alternatively, the number of the resistances 41 being held active may be decreased with the duration of the power use by the internal loads, that is, at predetermined time intervals.

Figure 2B:
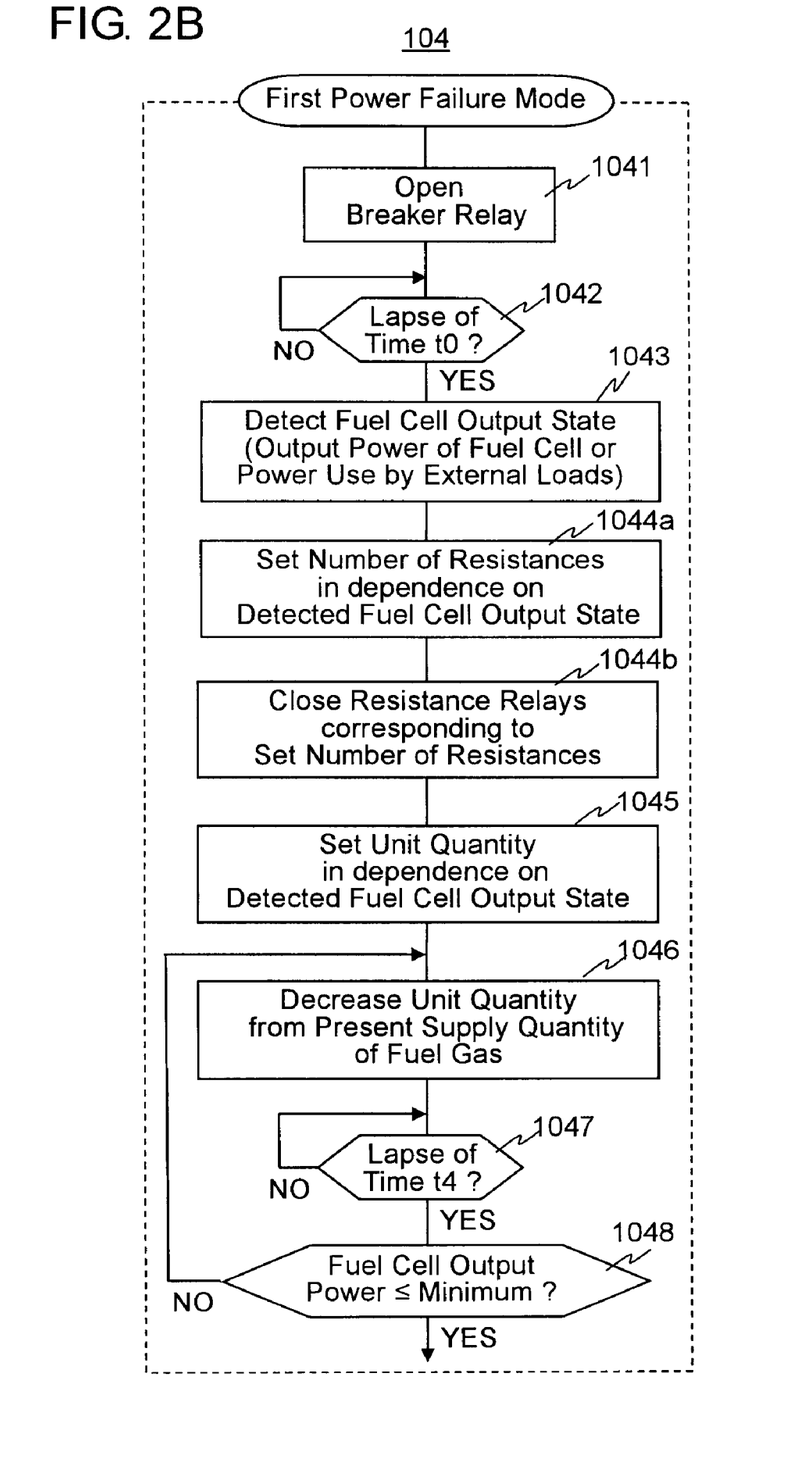
FIG. 2B is another partial flow chart showing the details of the step in FIG. 2 used in a modified form of the embodiment.

FIG. 2B shows the detailed processing for the first power failure mode executed at step 104 in FIG. 2 in this modified form of the embodiment. FIG. 2B is the same as FIG. 2A except for steps 1044*a* and 1044*b*, and therefore, the details of these steps 1044*a* and 1044*b* will be described hereafter.

That is, at step 1044*a*, in dependence on the fuel cell output state detected at step 1043, a determination is made regarding the number of the resistances 41 to be brought into active of those shown in FIG. 3. A larger number of resistances 41 are selected in the case of the fuel cell output state being indicative of a larger output power, whereas a smaller number of resistances 41 are selected in the case of the fuel cell output state being indicative of a smaller output power. The resistance relays 42 of the number so determined are closed at step 1044*b*. As a consequence, the output power of the fuel cell 11 can be used by the internal loads (i.e., resistance 41, heater devices 11*a*, 31*a*, auxiliary devices 14 and the like) appropriately in dependence on the power output state of the fuel cell 11 (i.e., the output power from the fuel cell 11 or the power use by the external loads 19). In other words, the power use by the internal loads can be altered by changing the number of the resistances 41 to be held active, in dependence on the output power from the fuel cell 11 or the power use by the external loads 19.

With this modified form, it can be realized to further suppress the temperature increases of the internal loads and hence, to suppress the deterioration of the peripheral devices. In addition, it becomes possible to regulate the use of the output power from the fuel cell 11 surely in a simplified construction in dependence on the output power of the fuel cell 11 or the power use by the external loads 19.

The internal loads include other heater devices for heating the components (e.g., reformer 21, reforming water tank (not shown)) of the fuel cell system than the heater devices 31*a*, 11*a* provided on the reserved hot water tank 31 and the fuel cell 11. The heater devices in this case desirably have a heating capacity of several hundred watts.

In the foregoing embodiment, besides the resistance 41, the heater devices and other loads may be used simultaneously as the loads which use the electric power during the power failure. As the loads which use the electric power during the power failure, the heater devices may be used in place of the resistance 41. Further, the resistance 41 may be connected to be supplied with the electric power derived from the auxiliary DC/DC converter 15*f*.

Finally, various features and many of the attendant advantages in the foregoing embodiments will be summarized as follows:

In the foregoing embodiment shown in FIGS. 1, 2 and 2A, when the system power source 12 falls in a power failure during the power use by the external loads 19, at least one of the power use by the internal loads and the supply quantity of the fuel gas supply device 20 is controlled to be altered in dependence on the output power from the fuel cell 11 or the power use by the external loads 19. Thus, it can be realized to use the output power of the fuel cell 11 appropriately in dependence on the output power of the fuel cell 11 or on the power use by the external devices 19. Further, since the output power of the fuel cell 11 is used by altering at least either one of the electric power used by the internal loads and the supply quantity from the fuel gas supply device 20, it becomes possible to suppress the temperature increases of the internal loads and hence, to suppress the deterioration of peripheral devices.

Also in the embodiment typically shown in FIG. 1, since the alteration in the power use by the internal loads is made based on the temperature correlating with the internal loads (e.g., 41) or on the duration of the power use by the internal loads, it becomes possible to suppress the temperature increases of the internal loads and hence, to suppress the deterioration of the peripheral devices.

Also in the foregoing embodiment typically shown in FIG. 1, since the internal loads comprises the resistance 41, it can be realized to use the output power of the fuel cell 11 appropriately in a simplified construction while suppressing an increase in the number of components for the fuel cell system and hence, an increase in cost.

In a modified form shown in FIGS. 3 and 2B, since the plurality of resistances 41 are connected in parallel to one another and since the switches 42 are provided in series respectively to the respective resistances 41 for switching the active states and the passive states of the respective resistances 41, it becomes possible to regulate the use of the output power from the fuel cell 11 surely in a simplified construction in dependence on the output power of the fuel cell 11 or the power use by the external loads 19.

In the foregoing embodiment typically shown in FIG. 1 or in the modified form shown in FIG. 3, the resistance 41 or resistances 41 are arranged between the fuel cell 11 and the inverter system 15 in parallel to the inverter system 15. Thus, since the output power of the fuel cell 11 can be directly used by the resistance 41 or resistances 41 without passing through the inverter system 15, it becomes possible to use the output power of the fuel cell 11 surely regardless of the inverter system 15.

Also in the foregoing embodiment typically shown in FIG. 1, since the internal loads include the existing heater devices 11a, 31a which are provided for heating the fuel cell system, it becomes possible to use the output power of the fuel cell 11 surely without involving an increase in the number of components for the fuel cell system and an increase in cost.

Obviously, numerous further modifications and variations of the present invention are possible in light of the above teachings. It is therefore to be understood that within the scope of the appended claims, the present invention may be practiced otherwise than as specifically described herein.

What is claimed is:

1. A fuel cell system comprising:
    a fuel cell to generate electric power through the reaction of fuel gas with oxidizing gas to supply the generated electric power to internal loads and external loads which are arranged respectively inside and outside the fuel cell system, the internal loads including at least one resistance;
    a system power source to supply electric power to the internal loads and the external loads;
    an inverter system coupled between the fuel cell and the system power source, and having a first function of converting direct current voltage outputted from the fuel cell into predetermined alternating current voltage to output the alternating current voltage to power lines connected to the system power source, a second function of converting alternating current voltage from the power lines into predetermined direct current voltage to output the direct current voltage to the internal loads, and a third function of converting the direct current voltage from the fuel cell into predetermined direct current voltage to output the direct current voltage to the internal loads;
    a fuel gas supply device to supply the fuel cell with fuel gas of a regulated quantity;
    a power failure breaker relay between the inverter system and the system power source;
    a temperature sensor that detects a temperature of the resistance;
    a switch that connects the resistance to an electrical output of the fuel cell; and
    a controller programmed to increase power use by the internal loads in dependence on a power output state of the fuel cell detected from an output power from the fuel cell or the power use by the external loads when the system power source falls in a power failure during power use by the external loads,
    wherein the controller increases the power use by opening the power failure breaker relay and by operating the switch so an amount of power used by the external loads prior to the power failure breaker relay being opened is used by the resistance, the switch being operated for a predetermined time if the temperature of the resistance does not exceed a predetermined temperature.

2. The fuel cell system as set forth in claim 1, wherein the at least one resistance is arranged between the fuel cell and the inverter system in parallel to the inverter system.

3. The fuel cell system as set forth in claim 2,
    wherein the at least one resistance includes a plurality of resistances connected in parallel to one another, and
    wherein the fuel cell system further includes switches provided in series respectively to the respective resistances that switch active states and passive states of the respective resistances.

4. The fuel cell system as set forth in claim 1, wherein the internal loads comprise an existing heater device provided for heating the fuel cell system.

5. The fuel cell system as set forth in claim 1, wherein
    the inverter system includes an output terminal to output the alternating current voltage to the power lines connected to the system power source, and
    the output terminal is disconnected from the power lines when the system power source falls in the power failure.

6. The fuel cell system as set forth in claim 1, wherein the controller intermittently opens and closes the switch in dependence on the output power state of the fuel cell detected from the output power from the fuel cell or the power use by the external loads.

7. The fuel cell system as set forth in claim 6,
    wherein a ratio of a switch open time to a switch closed time is determined in dependence on the output power state of the fuel cell detected from the output power from the fuel cell or the power use by the external loads.

8. A fuel cell system comprising:
    a fuel cell to generate electric power through the reaction of fuel gas with oxidizing gas to supply the generated electric power to internal loads and external loads which are arranged respectively inside and outside the fuel cell system, the internal loads including at least one resistance;
    a system power source to supply electric power to the internal loads and the external loads;
    an inverter system coupled between the fuel cell and the system power source, and having a first function of converting direct current voltage outputted from the fuel cell into predetermined alternating current voltage to output the alternating current voltage to power lines connected to the system power source, a second function of converting alternating current voltage from the power lines into predetermined direct current voltage to output the direct current voltage to the internal loads, and a third function of converting the direct current voltage from the fuel cell into predetermined direct current voltage to output the direct current voltage to the internal loads;

a fuel gas supply device to supply the fuel cell with fuel gas of a regulated quantity;

a power failure breaker relay between the inverter system and the system power source;

a temperature sensor that detects a temperature of the resistance; and a switch that connects the resistance to an electrical output of the fuel cell; and means for increasing power use by the internal loads in dependence on a power output state of the fuel cell detected from an output power from the fuel cell or the power use by the external loads when the system power source falls in a power failure during power use by the external loads, including opening the power failure breaker relay and operating the switch so an amount of power used by the external loads prior to the power failure breaker relay being opened is used by the resistance, wherein the means for increasing power operates the switch to increase the power use by the internal loads for a predetermined time if the temperature of the resistance does not exceed a predetermined temperature.

9. The fuel cell system as set forth in claim 8, wherein the means for increasing the power use by the internal loads opens and closes the switch in dependence on the output power state of the fuel cell detected from the output power from the fuel cell or the power use by the external loads.

10. The fuel cell system as set forth in claim 1, wherein the resistance is 300 watts.

11. The fuel cell system as set forth in claim 8, wherein the resistance is 300 watts.

* * * * *